United States Patent Office 3,417,037
Patented Dec. 17, 1968

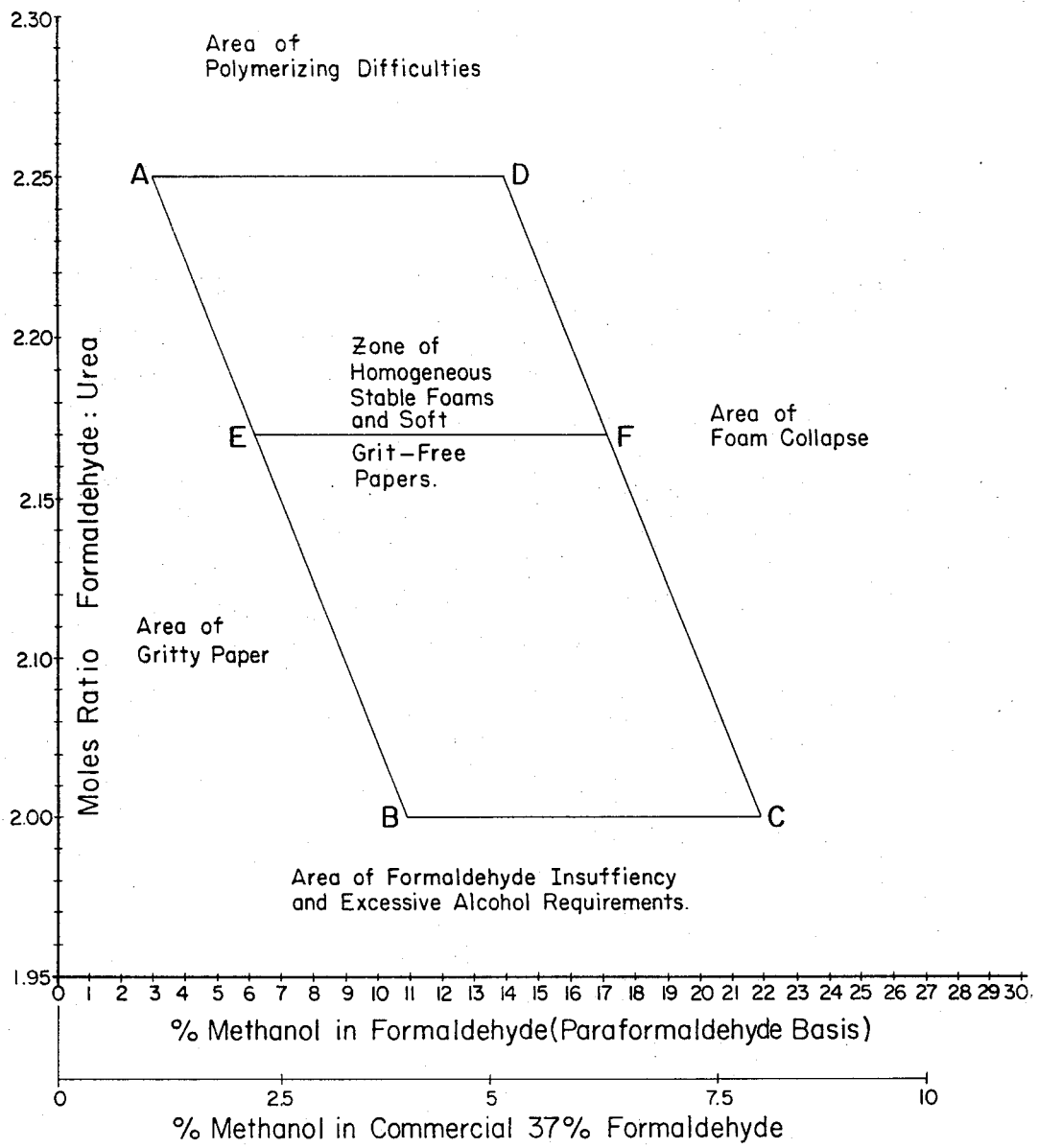

3,417,037
SHEET OF CELLULOSIC FIBER AND UREA-FORMALDEHYDE RESIN AND PROCESS OF MANUFACTURE THEREOF
John W. Eastes, Brevard, N.C., and Robert W. Faessinger, Media, Pa., assignors to Scott Paper Company, Delaware County, Pa., a corporation of Pennsylvania
Continuation of application Ser. No. 563,617, July 7, 1966, which is a continuation of application Ser. No. 275,079, Apr. 23, 1963, which is a continuation-in-part of application Ser. No. 861,435, Dec. 23, 1959. This application Dec. 6, 1967, Ser. No. 688,624
3 Claims. (Cl. 260—2.5)

ABSTRACT OF THE DISCLOSURE

An improved method of preparing urea-formaldehyde resins which are particularly suitable for use in preparing disintegrated particulate urea-formaldehyde foam filler materials for paper and paper-like products. Controlling the amount of alcohol present in relation to the ratio of formaldehyde to urea in the urea-formaldehyde condensation reaction provides a urea-formaldehyde resin prepolymer which, when subsequently foamed and disintegrated, results in a filler material which is particularly suitable for use in preparing filled, grit-free sheets of paper and paper-like products.

*Cross references to related applications*

This aplication is a continuation of once-copending U.S. Ser. No. 563,617, filed July 7, 1966, and now abandoned. U.S. Ser. No. 563,617 was, in turn, a continuation of U.S. Ser. No. 275,079, which was filed on Apr. 23, 1963, was once-copending with U.S. Ser. No. 563,613, and is now also abandoned. U.S. Ser. No. 275,079 was, in turn, a continuation-in-part of U.S. Ser. No. 861,435, which was filed on Dec. 23, 1959, was once-copending with U.S. Ser. No. 275,079, and is now also abandoned.

The present invention relates to an improvement in the preparation of urea-formaldehyde prepolymer resins convertible into diverse products and particularly into hardened foams of uniform structure of special application as a component of grit-free paper, paperboard and paper stocks.

The current trend to specialized papers embodying varying amounts of synthetic resins has heightened the interest of research workers in the development of fibrous substances which are readily compatible with cellulosic materials and capable of physical bonding therewith or which are susceptible of combination with cellulosic fibers through the use of separate bonding agents. Because paper, as it is generally known today, is composed of uni-axial and uni-dimensional filaments, wherein the ratio of length to diameter or width has an order of magnitude of from 10 to 1 to 100 to 1, with the fiber axes lying predominantly in the plane of the sheet, the synthetic materials incorporated in paper stocks have almost entirely been in the form of spun filaments aproximating the configuration of natural cellulosic fibers. Where it has been desired to modify to a considerable extent the physical aspects of the paper, slurries of greater density will enable the production of a thicker sheet, and with diminished compression during drying a bulkier, more porous product is enabled. Creping of the sheet as it is removed from the machine or an embossing, scoring or perforation step during finishing operations will also serve to disrupt the normal uniplanar sheet formation.

Many resins have ben used as paper additives. Some have been incorporated into the pulp in an intermediate stage of formation in order that post curing will impart wet strength, flame proofing, grease resistance and comparable characteristics to the ultimate products. Also some cured resins, in the form of discrete particles have been employed as fillers. It has also been discovered that certain synthetic resins can be converted into semi-rigid foams, with cellular structures exhibiting useful characteristics. A urea-formaldehyde prepolymer, for example, formed by condensing urea and formaldehyde in an approximate 1 to 2 molar ratio, may be foamed by addition to a cellulated mass of a surface active agent, water and acid catalyst such as sulfuric acid. Regulation of the density of the cellulated matrix by aeration thereof enables control of the density of the resin foam within limits of from 0.2 to 0.8 pounds per cubic foot. Additionally, it has been noted that the degree of aeration and matrix agitation effects the fineness of the ultimate foam which can have as many as $10^5$ cells per cubic centimeter. Upon curing and drying there will be observed some regulable collapse or reticulation of the cell structure leaving a skeletal configuration composed of rod-like strands and assemblies, which under agitation may be disintegrated into fragments, segments and cell residues of various degrees of complexity. Melamine-formaldehyde resins, mixed melamine-urea-thiourea condensation products with formaldehyde and phenol-formaldehyde resins may be similarly processed to produce lightweight foams. Other foamed resins are disclosed in U.S. Patents Nos. 2,273,367, 2,384,387, 2,559,891 and 2,813,780 and British Patents Nos. 768,562 and 773,809.

Preparation of the urea-formaldehyde resin solutions employed in the foaming operation has been described in detail in U.S. Patent No. 2,858,195, as well as Belgian Patents 565,130 and 569,190. As is noted in the patent disclosures, specialized equipment is required for foaming these resins and even then difficulties in controlling the physical and chemical properties of the resin solutions have prevented consistent production of foams acceptable for inclusion in paper furnishes.

It is an object of our invention to provide a labile, urea-formaldehyde resin solution convertible into a foam structure from which may be obtained a product which is blendable with conventional filamentary material for the preparation of sheeted, grit-free, paper-like products.

Another object of the present invention is the provision of an improved urea-formaldehyde resin solution readily foamable to yield a paper furnish additive that will impart softness and high, grit-free bulk to sheeted, paper-like products manufactured therefrom.

Other objects and advantages of our invention will be apparent from the following detailed description of certain preferred embodiments thereof.

Briefly stated, the present invention contemplates the controlled condensation of urea and formaldehyde in the presence of restricted and regulable amounts of methyl alcohol, wherein the relationship of the components is represented by FIGURE 1.

It is known that certain synthetic resins may be converted into semi-rigid foams with uniform, dimensionally stable structures. Urea-formaldehyde prepolymers, for example, are readily foamed and converted into a frangible, cellular mass, which upon drying, disintegrates to a considerable degree. A more resilient and tough, although heavier, foam may be prepared by the inclusion of fibrous fillers in the resin prepolymer and a reduction of the amount of foaming to which the solution is suggested. In another method, a foam of satisfactory light weight and resiliency has resulted from the addition to an aqueous solution of the urea-formaldehyde prepolymer to a cellulated mass or froth composed of surfactant, water and acid catalyst. Further condensation of the dispersed prepolymer under the influence of the acid catalyst occurred in the cell walls of the froth and the mass congealed or hardened in situ. Regulation of the density of the cellulated matrix by aeration thereof enables control of the density of the resin foam within limits of from 0.2 to 0.8 pounds per cubic foot. Upon curing and drying, there will be observed some regulable collapse or reticulation of the cell structure leaving a skeletal configuration composed of rod-like strands and assemblies, which under agitation may be disintegrated into segments and cell residues of various degrees of complexity and finally into branched or multi-axial fiber nodes comprising broken residual junctions of the original foam structure.

As is known to those skilled in the art, the conventional 37% grade formaldehyde solution contains methyl alcohol as an inhibitor or stabilizer. In some instances, the use of this inhibited formaldehyde in the preparation of urea-formaldehyde resins so affects the condensation reaction that undesirable products are obtained. An optional procedure in the manufacture of these resin solutions might be the employment of paraformaldehyde, a polymeric form of formaldehyde in solid form, soluble in water to reconstitute formaldehyde. The use of paraformaldehyde, however, does not eliminate all procedural difficulties unless its solutions are modified to include methyl alcohol within certain specified concentrations.

The invention is accomplished by a process of preparing a urea-formaldehyde prepolymer suitable for forming a reticulated foam urea-formaldehyde structure comprising the steps of initiating a reaction in an aqueous mixture at a pH in excess of 7 of formaldehyde and urea wherein the molar ratio of formaldehyde to urea is of from 2.00:1 to 2.25:1, an aliphatic monohydric alcohol having from 1 to 5 carbon atoms in the alcohol molecule, wherein the amount of alcohol present is based depending on the formaldehyde to urea ratio such that at 2.25:1 formaldehyde to urea ratio, the amount of alcohol by weight percent based on paraformaldehyde is of from 3% to 14%, at 2.00:1 formaldehyde to urea ratio, the amount of alcohol by weight percent based on paraformaldehyde is of from 11% to 22%, and provided that when the ratio of formaldehyde to urea is varied in increments from 2.25 to 2.00, the amount of alcohol present by weight percent based on paraformaldehyde is varied co-extensively in increments from not less than 3% at the 2.25:1 formaldehyde-urea ratio to not less than 11% at the 2.00:1 formaldehyde-urea ratio, and provided further that when the ratio of formaldehyde to urea is varied in increments of from 2.25 to 2.00, the amount of alcohol present by weight percent based on paraformaldehyde is varied co-extensively in increments from not more than 14% at the 2.25:1 ratio to not more than 22% at the 2.00:1 ratio; acidifying said incompletely reacted mixture to a pH of from 3 to 6; subjecting the mixture to further heat induced condensation; and halting the final prepolymer condensation at a stage in which the mixture possesses a viscosity of from 40 to 60 centistokes at 20° C.

The accomplished invention is represented by a labile, urea-formaldehyde resin prepolymer solution suitable for forming a reticulated foam-urea-formaldehyde structure obtained by the above process. The prepolymer solution is characterized by the fact that when the final reticulated urea-formaldehyde structure in a comminuted form is incorporated in a paper sheet, said sheet has a grit-free feel.

More specifically, the invention is also accomplished by a process of preparing a urea-formaldehyde prepolymer suitable for forming a reticulated foam-urea-formaldehyde structure comprising the steps of initiating a reaction in an aqueous mixture at a pH in excess of 7 of formaldehyde and urea, wherein the molecular ratio of formaldehyde to urea is of from 2.00:1 to 2.17:1, an aliphatic monohydric alcohol having from 1 to 5 carbon atoms in the alcohol molecule, wherein the amount of alcohol present is based depending on the formaldehyde to urea ratio, such that at 2.17:1 formaldehyde to urea ratio, the amount of alcohol present by weight percent based on paraformaldehyde is of from 6% to 17%, at 2.00:1 formaldehyde to urea ratio, the amount of alcohol present by weight percent based on paraformaldehyde is of from 11% to 22%, and provided that when the ratio of formaldehyde to urea is varied in increments from 2.17 to 2.00, the amount of alcohol present by weight percent based on paraformaldehyde is varied coextensively in increments from not less than 6% at the 2.17:1 ratio of formaldehyde to urea to not less than 11% at the 2.00:1 ratio of formaldehyde to urea, and provided further that when the ratio of formaldehyde to urea is varied in increments of from 2.17 to 2.00, the amount of alcohol by weight percent based on paraformaldehyde is varied coextensively in increments from not more than 17% at the 2.17:1 formaldehyde to urea ratio to not more than 22% at the 2.00:1 ratio; acidifying said incompletely reacted mixture to a pH of 5; subjecting the mixture to further heat induced condensation, and halting the final prepolymer condensation at a stage in which the mixture possesses a viscosity of from 45 to 55 centistokes at 20°. Again, in the above process methyl alcohol is the more preferred alcohol.

The accomplished invention is represented by a labile, urea-formaldehyde resin prepolymer solution suitable for forming a reticulated foam-urea-formaldehyde structure obtained by the last described process. The prepolymer solution is characterized by the fact that when the final reticulated area-formaldehyde structure in a comminuted form is incorporated in a paper sheet, said sheet has a grit-free feel.

The coextensive variation of acceptable formaldehyde to urea ratio versus amount of alcohol is defined in FIGURE 1 by the parallelogram A B C D. Outside the defined area, the product is unacceptable. A more specific preferred area is represented in FIGURE 1 as A E F D.

Expressing the invention as represented by the relationship set out in the graph, the invention is also accomplished by a process of preparing a urea-formaldehyde prepolymer suitable for forming a reticulated foam-urea-formaldehyde structure comprising the steps of:

(1) Initiating a reaction in an aqueous mixture at a pH in excess of 7 of formaldehyde to urea, and an aliphatic monohydric alcohol having from 1 to 5 carbon atoms in the alcohol molecule, wherein the amounts of said three components is represented by the area defined as A B C D in FIGURE 1;

(2) Acidifying said incompletely reacted mixture to a pH of from 3 to 6;

(3) Subjecting the mixture to further heat induced condensation, and (4) Halting the final prepolymer condensation at a stage in which the mixture possesses a viscosity of from 40 to 60 centistokes at 20° C.

In the preferred mode of operation, methyl alcohol is used. The preferred precondensate product as prepared by the last process also contains methyl alcohol.

Further, the invention in the more preferred form is accomplished by a process of preparing a urea-formaldehyde prepolymer suitable for forming a reticulated foam urea-formaldehyde structure comprising the steps of:

(1) Initiating a reaction in an aqueous mixture at a pH in excess of 7 of formaldehyde to urea, and an aliphatic monohydric alcohol having from 1 to 5 carbon atoms in the alcohol molecule, wherein the amounts of said three components are represented by the area defined as A E F D in FIGURE 1;

(2) Acidifying said completely reacted mixture to a pH of about 5;

(3) Subjecting the mixture to further heat induced condensation, and (4) Halting the final prepolymer condensation at a stage in which the mixture possesses a viscosity of from 45 to 55 centistokes at 20° C.

In the preferred mode of operation, methyl alcohol is used. The preferred precondensate product as prepared by the last process also contains methyl alcohol.

The reaction between urea and the inhibited formaldehyde is initiated under alkaline conditions, such alkalinity being assured by the inclusion of sodium hydroxide in the reaction mixture, and continued under acid conditions until the resin solution attains a viscosity of from 40 to 60 centistokes at 20° C. Further condensation is arrested by neutralization of the reaction mixture.

The invention is illustrated in more detail in the following examples, wherein the proportions of reagents employed are expressed as parts by weight.

EXAMPLE 1

A mixture of 480 parts of urea, 480 parts of paraformaldehyde, 783.8 parts of water, 69.5 parts of 99% methanol and 4 parts of 4 M sodium hydroxide was placed in a glass reaction flask of adequate size fitted with a reflux condenser, thermometer, mechanical stirrer and mixed for 5 minutes. Then 82.4 parts of 24% ammonium hydroxide were added and this mixture refluxed (97° C.) for 15 minutes. Then 3 parts of 4 M phosphoric acid were added and this mixture refluxed until a test sample, cooled to 20° C., had a viscosity of 45.1 centistokes. The reaction was stopped by the addition of 14 parts of sodium hydroxide solution. This resin became slightly cloudy upon standing at room temperature for 3 hours. The resin solution was converted into foam and after curing, disintegration and incorporation into paper pulp in the ratio of 3 parts disintegrated foamed resin to 7 parts pulp, handsheets were formed which, although grit-free, did not possess the desirable velvet-like surface of the other examples.

The mole ratio of formaldehyde to urea is 2.00:1.00. The weight of methyl alcohol is approximately 14% of the paraformaldehyde used in the formulation.

EXAMPLE 2

A mixture of 480 parts of urea, 480 parts of paraformaldehyde, 4 parts of 4 M sodium hydroxide solution, 713 parts of water and 93.3 parts of 99% methanol was placed in a glass reaction flask of adequate size fitted with a reflux condenser, mechanical stirrer and thermometer, and mixed for 5 minutes. Then 82.4 parts of 24% ammonium hydroxide were added, the mixture heated to reflux (20 minutes), and refluxed for 15 minutes. At this point, 4 parts of 4 M phosphoric acid were added and reflux continued (about 2 hours) until the viscosity of a test portion cooled to 20° C. was 57 centistokes. Then the reaction was stopped by the addition of 14 parts of 10% sodium hydroxide solution. The resin solution was converted into foam and after curing, disintegration and incorporation into paper pulp in the ratio of 3 parts disintegrated foamed resin to 7 parts pulp, handsheets were formed which were smooth, soft, grit-free and had a specific volume about 3.0 cc./g.

The mole ratio of formaldehyde to urea again is 2.00:1.00. The weight of methyl alcohol is approximately 19.5% of the paraformaldehyde used in the formulation.

EXAMPLE 3

A mixture of 240 parts of urea, 260 parts of paraformaldehyde, 2 parts of 4 M sodium hydroxide solution, 440.5 parts of water and 22.9 parts of 99% methanol was thoroughly blended and 41.2 parts of 24% ammonium hydroxide were added to the mixture and this stirred mixture was heated to reflux (20 minutes) and refluxed (99° C.) for 15 minutes. At this point, 2 parts of 4 M phosphoric acid were added and reflux continued (about 2 hours) to produce resin solutions of different viscosities as follows:

| Sample: | Viscosity at 20° C., centistokes |
|---|---|
| A | 12.8 |
| B | 27.8 |
| C | 50.8 |

The reaction was stopped by the addition of 7 parts of 10% sodium hydroxide solution. Resin Samples A and B could not be foamed satisfactorily. Resin solution C was converted into foam and after curing, disintegration and incorporation into paper pulp in the ratio of 3 parts disintegrated foamed resin to 7 parts paper pulp, handsheets were formed which were smooth, soft, grit-free and had a specific volume above 3.0 cc./g.

The mole ratio of formaldehyde to urea is 2.17:1.00. The weight of methyl alcohol is approximately 8.6% of the paraformaldehyde used.

EXAMPLE 4

A mixture of 240 parts of urea, 260 parts of paraformaldehyde, 2 parts of 4 M sodium hydroxide solution, 425.4 parts of water and 38 parts of 99% methyl alcohol was thoroughly blended and 41.2 parts of 24% ammonium hydroxide were added to the mixture with reflux for 15 minutes. At this point 2.6 parts of 4 M phosphoric acid were added and condensation continued to produce resin solutions of three different viscosities as follows:

| Sample: | Viscosity at 20° C., centistokes |
|---|---|
| A | 29.6 |
| B | 45.0 |
| C | 65.3 |

Resin solution B was converted into foam and after curing, disintegration and incorporation into paper pulp in the ratio of 3 parts disintegrated foamed resin to 7 parts paper pulp, handsheets were formed which were smooth, soft, grit-free and had a specific volume above 3.0 cc./g. Resin Sample A could not be foamed, while disintegrated foam from resin Sample C gave harsh and gritty sheets.

The mole ratio of formaldehyde to urea is 2.17:1.00. The weight percent of the methyl alcohol is approximately 14% of the paraformaldehyde used in the formulation.

EXAMPLE 5

A mixture of 1080 parts of urea, 3170.3 parts of 37% U.S.P. formaldehyde (containing 10% methyl alcohol), 90 parts of water and 9 parts of 4 M sodium hydroxide, 185.4 parts of 24% ammonium hydroxide was placed in a reaction flask of adequate size fitted with a reflux condenser and a Dean-Stark distilling tube receiver, thermometer, mechanical stirrer and heated under agitation to reflux temperature, 92° C. Heating was continued with distillation and 550 parts of distillate collected over a period of approximately 1.5 hours. Then 550 parts of water were added to the flask to replace the distillate removed. This mixture was returned to reflux temperature (100° C.) and 5.5 parts of 4 M phosphoric acid was added. Reflux was continued (about 2 hours) until the viscosity of a test portion measured at 20° C. was 46.4 centistokes. The reaction was then stopped by the addition of 22 parts of 10% sodium hydroxide solution.

The resin solution was converted into foam and after curing, disintegration and incorporation into paper pulp in the ratio of 3 parts disintegrated foamed resin to 7 parts pulp, handsheets were formed which were free of grit, had good bulking properties and had a smooth velvety feel.

In this example, the methyl alcohol content after the 550 parts of distillate were replaced with an equal weight of water was the equivalent to that of starting with an inhibited formaldehyde solution having a 3–5% methyl alcohol content. The mole ratio of formaldehyde to urea is approximately 2.17:1.00. The weight of methyl alcohol is from 8.6–14% of the paraformaldehyde used in the formulation.

EXAMPLE 6

To a mixture of 1200 parts of urea, 1349 parts of paraformaldehyde, 10 parts 4 M sodium hydroxide solution, 2222.6 parts of water and 37.4 parts of 99% methyl alcohol were added 206 parts of 24% ammonium hydroxide, the materials were brought to reflux temperature (20 minutes) and refluxed for 15 minutes. At this point 8 parts of 4 M phosphoric acid were added and reflux continued (about 2 hours) until the viscosity of a test portion cooled to 20° C. was 41.5 centistokes. The reaction was then stopped by the addition of 35 parts of 10% sodium hydroxide solution. The resin solution was converted into foam and after curing, disintegration and incorporation with paper pulp at the ratio of 3 parts disintegrated foamed resin to 7 parts paper pulp, handsheets were formed which were smooth, soft, grit-free and had a specific volume above 3.0 cc./g.

The mole ratio of formaldehyde to urea is 2.25:1.00. The weight of the methyl alcohol is approximately 3% of the paraformaldehyde used in the formulation.

EXAMPLE 7

To a mixture of 1200 parts of urea, 1349 parts of paraformaldehyde, 10 parts of 4 M sodium hydroxide solution, 2147.8 parts of water, and 112.2 parts of 99% methyl alcohol were added 206 parts of 24% ammonium hydroxide, the materials were brought to reflux temperature with stirring (20 minutes) and refluxed for 15 minutes. At this point 9 parts of 4 M phosphoric acid were added and reflux continued (about 2 hours) until the viscosity of a test portion, cooled to 20° C. was 49.4 centistokes. The reaction was then stopped by the addition of 35 parts of 10% sodium hydroxide solution. The resin solution was converted into foam and after curing, disintegration and incorporation with paper pulp at the ratio of 3 parts disintegrated foamed resin to 7 parts paper pulp, handsheets were formed which were smooth, soft, grit-free and had a specific volume above 3.0 cc./g.

EXAMPLE 8

To a mixture of 1200 parts of urea, 1349 parts of paraformaldehyde, 2200 parts of water, 197.2 parts of 99% methanol and 10 parts of 4 M sodium hydroxide were added 206 parts of 24% ammonia hydroxide and the materials were heated to reflux (97° C.) for 15 minutes. Then 8 parts of 4 M phosphoric acid were added and reflux continued until the viscosity of a sample, cooled to 20° C. was 49.5 centistokes. The reaction was stopped by addition of 35 parts of 10% sodium hydroxide solution. This neutralized resin solution remained clear after standing at room temperature for several days.

The resin solution was converted into foam and after curing, disintegration and incorporation into paper pulp at the ratio of 3 parts disintegrated foamed resin to 7 parts paper pulp, hand-sheets were formed which were grit-free and had a smooth velvet-like feel.

The mole ratio of formaldehyde to urea is 2.25:1.00. The weight percent of the methyl alcohol is approximately 14% of the paraformaldehyde used in the formulation.

The following table summarizes the several examples:

TABLE I.—ACCEPTABLE U-F RESINS

| Example | Mole Ratio Formaldehyde:Urea | Methyl Alcohol, Percent Paraformaldehyde Basis | Viscosity, Centistokes | Remarks |
|---|---|---|---|---|
| 1 | 2.00:1.00 | 14 | 45.1 | Handsheets are grit-free, but have slightly harsh feel. Paraformaldehyde used. |
| 2 | 2.00:1.00 | 19.5 | 57.0 | Handsheets are grit-free and have a good feel. Paraformaldehyde used. |
| 3C | 2.17:1.00 | 8.6 | 50.8 | Do. |
| 4B | 2.17:1.00 | 14.0 | 45.0 | Do. |
| 5 | 2.17:1.00 | 8.6–14.0 | 46.4 | Handsheets are grit-free and have a good feel. 36% formaldehyde inhibited with 10% CH₃OH was used. 5–7% of CH₃OH was removed by distillation. |
| 6 | 2.25:1.00 | 3 | 41.5 | Handsheets are grit-free and have a good feel. Paraformaldehyde used. |
| 7 | 2.25:1.00 | 8.6 | 49.4 | Do. |
| 8 | 2.25:1.00 | 14.0 | 49.5 | Do. |

In addition to the above examples, numerous samples of resin solution have been prepared in accordance with the above general process with the exception that the percent of methyl alcohol employed was outside the preferred range for the mole ratio of formaldehyde to urea used. The criticality of the methanol content is readily apparent.

TABLE II.—OTHER U-F RESINS

| Example | Mole Ratio Formaldehyde:Urea | Methyl Alcohol, Percent Paraformaldehyde Basis | Viscosity, Centistokes | Remarks |
|---|---|---|---|---|
| a | 2.00:1.00 | 0 | 57.0 | Handsheets are very gritty; resin became milky-white after standing at room temperature overnight. Paraformaldehyde used. |
| b | 2.17:1.00 | 0 | 48.0 | Handsheets are gritty; alcohol was removed by distillation from 10% inhibited formaldehyde. |
| c | 2.17:1.00 | 0 | 49.0 | Handsheets are gritty. Paraformaldehyde used. |
| d | 2.17:1.00 | 27 | 46.2 | Foam collapsed. 36% formaldehyde inhibited with 10% CH₃OH was used. |
| e | 2.17:1.00 | 27 | 44.0 | Foam collapsed. Paraformaldehyde used. |
| f | 2.25:1.00 | 0 | 46.1 | Harsh to gritty handsheets. Paraformaldehyde used. |
| g | 2.50:1.00 | 0 | 44.7 | Foam collapsed. Paraformaldehyde used. Resin is very hard to make. A point is reached where the rate of polymerization was equal to the rate of depolymerization. |

The mole ratio of formaldehyde to urea is 2.25:1.00. The weight percent of the methyl alcohol is approximately 8.6% of the paraformaldehyde used in the formulation.

It will be noted from the above examples that ammonium hydroxide has been included in the reaction mixture as a modifier insuring production of a cationic resin.

It is, of course, possible to use amines, such as, mono-, di- and triethanol amines as well as other related compounds to accomplish the same objective.

TABLE III

| Example | Mole Ratio Formaldehyde:Urea | Methyl Alcohol, Percent Paraformaldehyde Basis | Viscosity, Centistokes | Remarks |
|---|---|---|---|---|
| h | 3.17:1.00 | 0 | (¹) | No polymer buildup. |
| i | 2.50:1.00 | 14 | 52.0 | Unstable foam which collapsed. |
| j | 2.17:1.00 | 3 | 49.7 | Gritty handsheets. |
| k | 2.17:1.00 | 5.5 | 51.3 | Slightly gritty handsheets. |
| l | 2.17:1.00 | 19.5 | 47.5 | Somewhat unstable foam. |
| m | 2.09:1.00 | 8.4 | 46.2 | Gritty handsheets. |

¹ Viscosity does not increase.

The data of Tables I and II illustrate more convincingly the various coacting parameters of urea, formaldehyde, alcohol and viscosity. All examples are on paraformaldehyde basis. Some typical examples in Table III show the results of a wide variety of experiments. These experiments as they relate to the graph on FIGURE 1 clearly delineate the present invention.

Although we are not at all sure of the mechanisms involved in these coacting parameters, it may well be that they interact to assure the production of structures which promote homogeneity of the fine reticulation to result in both internal and external foam stability with uniform gellation characteristics such that upon disintegration and introduction into the fiber furnish, soft, grit-free paper products will result.

Further modification of the reaction mixture and final resin solution by the introduction therein of small quantities of thiourea or melamine to supplement or as a substitute for a part of the urea content is also possible. In this connection, it should be pointed out that the non-volatile solids (formaldehyde and urea or substitutes) should comprise at least 40% of the initial solution in order that the reaction therebetween may proceed with maximum efficiency, for although mixtures of lesser concentrations of non-volatile solids could be condensed under more severe conditions than those which we have indicated to be desirable, the more concentrated solutions are to be preferred. Of course, excessive concentrations are to be avoided unless there is some dilution of the reacted mixture prior to the secondary condensation in order that solutions of the proper viscosity will be obtainable.

It is also to be noted that while phosphoric acid has been selected as the preferred pH regulator for final resin condensation, effected within a pH range of from 3–6 and more specifically a range of from 4.9 to 5.1, other acids could serve equally as well. And our illustrative use of methyl alcohol to modify the final resin prepolymer must be understood to encompass the other aliphatic alcohols, including ethyl, propyl, isopropyl butyl and amyl which are equally effective in regulation of the reaction and may be so employed, singly or in combination.

What is claimed it:

1. In a method for forming a grit-free sheet of cellulosic fibers having intimately intermixed among the fibers thereof a disintegrated, particulate urea-formaldehyde resin foam, wherein said foam is formed from a resin which is prepared by initiating a reaction in an aqueous mixture, at a pH in excess of 7, of formaldehyde and urea; acidifying said incompletely reacted mixture to a pH of from 3–6; subjecting the mixture to further heat-induced condensation; and halting the final pre-polymer condensation at a stage in which the mixture possesses a viscosity of from 40 to 60 centistokes at 20° C., the improvement comprising: employing in said aqueous mixture an aliphatic monohydric alcohol in an amount relative to the ratio of formaldehyde to urea such that it falls within the area defined by A E F D in FIGURE 1, whereby the resulting cellulosic fiber sheet is free from grit.

2. The improvement according to claim 1 wherein said aliphatic monohydric alcohol is methanol.

3. A grit-free sheet of cellulosic fibers and disintegrated, particulate urea formaldehyde resin foam, prepared according to the method claimed in claim 1.

No references cited.

WILLIAM H. SHORT, *Primary Examiner.*

H. SCHAIN, *Assistant Examiner.*

U.S. Cl. X.R.

260—17.3, 70